United States Patent [19]

Shimura et al.

[11] Patent Number: 4,777,373

[45] Date of Patent: Oct. 11, 1988

[54] RADIATION IMAGE RECORDING AND READ-OUT APPARATUS

[75] Inventors: Kazuo Shimura; Masamitsu Ishida, both of Kanagawa, Japan

[73] Assignee: Fuji Photo Film Co., Ltd., Kanagawa, Japan

[21] Appl. No.: 82,930

[22] Filed: Aug. 10, 1987

Related U.S. Application Data

[63] Continuation of Ser. No. 786,577, Oct. 11, 1985.

[30] Foreign Application Priority Data

Oct. 16, 1984 [JP] Japan .................................. 59-216911

[51] Int. Cl.⁴ .............................................. G01T 1/105
[52] U.S. Cl. ................................ 250/484.1; 250/327.2
[58] Field of Search ........................... 250/327.2, 484.1; 378/172, 173, 181

[56] References Cited

U.S. PATENT DOCUMENTS

| | | | |
|---|---|---|---|
| 1,897,177 | 2/1933 | Pohl | 248/122 |
| 2,650,308 | 8/1953 | Catlin | 378/163 |
| 4,210,815 | 7/1980 | Riehl | 378/189 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,543,479 | 9/1985 | Kato | 250/327.2 |
| 4,578,582 | 3/1986 | Takano | 250/327.2 |

FOREIGN PATENT DOCUMENTS

| | | |
|---|---|---|
| 0077678 | 4/1983 | European Pat. Off. . |
| 449463 | of 1915 | France .................. 378/181 |
| 2563639 | 10/1985 | France . |
| 2064261 | 6/1981 | United Kingdom . |

Primary Examiner—Janice A. Howell
Assistant Examiner—Constantine Hannaher
Attorney, Agent, or Firm—Sughrue, Mion, Zinn, Macpeak and Seas

[57] ABSTRACT

A built-in type radiation image and read-out apparatus comprises a circulating and conveying means for repeatedly conveying stimulable phosphor sheets through an image recording section, an image read-out section and an erasing section. The image recording section has a transfer means for adjusting the distance between an object support member and a stimulable phosphor sheet retainer, whereby recording of enlarged radiation image is possible.

3 Claims, 1 Drawing Sheet

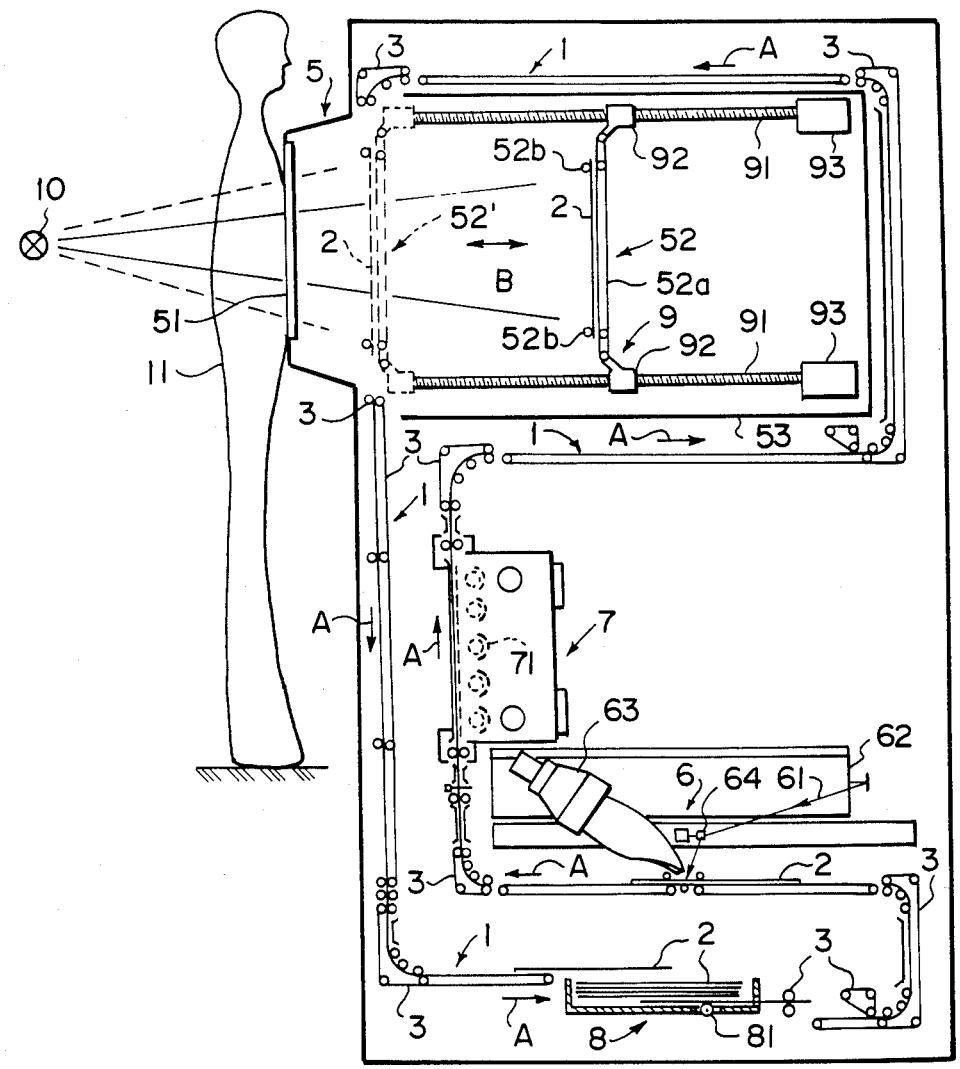

RADIATION IMAGE RECORDING AND READ-OUT APPARATUS

This is a continuation of application Ser. No. 786,577, filed Oct. 11, 1985.

BACKGROUND OF THE INVENTION

1. Field of the Invention

This invention relates to a radiation image recording and read-out apparatus for exposing a stimulable phosphor sheet to a radiation passing through an object to have a radiation image of the object stored thereon, exposing the stimulable phosphor sheet to stimulating rays which cause it to emit light in proportion to the stored radiation energy, and photoelectrically detecting the emitted light to obtain an electric image signal. This invention particularly relates to a radiation image recording and read-out apparatus in which the stimulable phosphor sheets are circulated and reused for recording radiation images.

2. Description of the Prior Art

When certain kinds of phosphors are exposed to a radiation such as x-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in Japanese Unexamined Patent Publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor is first exposed to a radiation passing through an object such as a part of the human body to have a radiation image stored thereon, and then is scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed so as to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a number of stimulable phosphor sheets, and the number of stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects on the stimulable phosphor sheets, transfer the electric image signals read out from the stimulable phosphor sheets onto a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be eliminated or erased as described, for example, in Japanese Unexamined Patent Publication No. 56(1981)-12599 and U.S. Pat. No. 4,400,619. This stimulable phosphor sheet can then be used again for radiation image recording.

The applicant therefore proposed in U.S. patent application No. 600,689 a built-in type radiation image recording and read-out apparatus comprising:

(i) a circulation and conveyance means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and consisting of a stimulating ray source for emitting stimulating rays for scanning said stimulable phosphor sheet carrying said radiation image stored thereon in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, exposing said stimulable phosphor sheet to erasing light to release the radiation energy remaining on said stimulable phosphor sheet;

whereby said stimulable phosphor sheet is circulated through said image recording section, said image read-out section and said erasing section and reused for radiation image recording.

On the other hand, in recording the radiation image of an object on a stimulable phosphor sheet it is often preferable to record an enlarged radiation image of a certain portion of the object such as the chest or abdomen since this type of recording provides higher resolution and reduces the adverse effect of scattered rays, making it possible to observe the portion concerned in greater detail. Such enlarged radiation image recording is conducted by adjusting the positional relation among the radiation source, the object and the stimulable phosphor sheet.

In view of the advantages of enlarged radiation image recording, it is of course desirable to provide the built-in type radiation image recording and read-out apparatus with the ability to conduct image recording of this type. Moreover, in providing the built-in type apparatus with this capability, it is preferable to do so in a manner that will enable the recording of enlarged radiation images as easily and smoothly as possible since the built-in type apparatus is by nature required to be capable of recording the radiation images of a large number of objects in rapid succession.

SUMMARY OF THE INVENTION

The primary object of the present invention is to provide a built-in type radiation image recording and read-out apparatus capable of recording enlarged radiation images in an easy and smooth manner.

The present invention provides a built-in type radiation image recording and read-out apparatus comprising a circulation and conveyance means for repeatedly conveying stimulable phosphor sheets through an image recording section, an image read-out section and an erasing section, and a transfer means for adjusting the distance between an object support member and a stimulable phosphor sheet retainer in said image recording section.

BRIEF DESCRIPTION OF THE DRAWING

The single figure is a schematic side view of an embodiment of the radiation image recording and read-out apparatus in accordance with the present invention.

DESCRIPTION OF THE PREFERRED EMBODIMENT

Referring to the figure, the radiation image recording and read-out apparatus is provided with a circulation path 1 along which stimulable phosphor sheets 2 are conveyed by a circulation and conveyance means 3 comprised of drive rollers, conveyor belts and the like.

An image recording section 5, an image read-out section 6 and an erasing section 7 are spaced along the circulation path 1 in the direction of travel of the stimulable phosphor sheets as indicated by the arrows A. The image recording section 5 is provided with a radiation source 10 which is activated to transmit a radiation through an object 11 onto one of the sheets 2 so as to record a radiation image of the object 11 on the sheet 2.

After the sheet 2 has been recorded with a radiation image of the object 11, the drive rollers, conveyor belts etc. of the circulation and conveyance means 3 convey it along the circulation path 1 in the direction of the arrows A until it arrives at the image read-out section 6.

The image read-out section 6 is provided with a stimulating ray source 62 for producing stimulating rays 61, e.g. a laser beam, and a photoelectric read-out means 63, e.g. a photomultiplier, for coverting the light emitted by the sheet 2 when it is scanned by the stimulating rays 61 into an electric image signal. Scanning of the sheet 2 with the stimulating rays 61 is accomplished using a galvanometer mirror 64. The electric image signal obtained from the photoelectric read-out means 63 is sent to an image processing circuit (not shown) for processing the electric image signal as required. The image signal thus processed is then sent to an image reproducing apparatus (not shown). The image reproducing apparatus may be a display device such as a CRT, or a device for recording a visible image by point-by-point scanning on a photographic film. Or, the image signal may be stored in a storage medium such as a magnetic tape.

After image read-out is finished, the sheet 2 is conveyed by the circulation and conveyance means 3 to the the erasing section 7. The erasing section comprises many erasing light sources 71, e.g. fluorescent lamps, which emit visible erasing light. When the sheet 2 is exposed to this erasing light, the radiation energy remaining in the sheet 2 after the read-out is released.

After erasing of the sheet 2 is completed, the circulation and conveyance means 3 conveys the sheet back to the image recording section 5.

A stacking zone 8 is also provided on the circulation path 1 between the image recording section 5 and the image read-out section 6 so that when the recording of radiation images on the sheets 2 proceeds faster than the reading out of images therefrom, the sheets 2 waiting for read-out can wait at the stacking zone 8. The sheets 2 entering the stacking zone 8 are fed out therefrom by a roller 81 in the order that they were received.

The image recording section 5 has an object support member 52 and a sheet retainer 52 for holding the sheets 2. As shown in the figure, when a radiation image of a portion of the object is to be recorded, this portion is brought into contact with the object support member 51 to be properly positioned thereby. It should be understood, however, that although the object support member 51 can be conveniently used as a positioning member or surface for the object, it is also possible to record the radiation image of an object without bringing it into contact with the object support member 51.

The sheet retainer 52 is for holding the sheet 2 in position for recording of a radiation image thereon and is supported so that its main surfaces lie perpendicular to a line passing from the radiation source 10 through the center of the object support member 51. In the illustrated embodiment, the sheet retainer 52 is supported on a transfer means 9 so as to be movable toward and away from the object support member 51 as indicated by the arrows B. It is therefore possible to adjust the interval between the object support member 51 and the sheet retainer 52.

The sheet retainer 52 comprises a belt conveyor 52a and retainer rollers 52b for pressing the sheet onto the belt conveyor 52a, while the transfer means 9 for moving the sheet retainer 52 comprises a pair of upper and lower externally threaded screws 91 disposed in the direction of the arrows B at a prescribed distance from each other, a pair of internally threaded members 92 one threadedly fitted on each of the screws 91 and motors or other drive means 93 for rotating the screws 91. The belt conveyor 52a of the sheet retainer 52 is supported at its upper and lower ends by the threaded members 92. As shown in the drawing, the sheet retainer 52 and the transfer means 9 are enclosed in a case 53 of lead or other radiation shielding material so as to prevent the sheets traveling along the circulation path 1 from being exposed to the radiation from the radiation source 10.

With the aforesaid arrangement, when the screws 91 are synchronously rotated in the forward (reverse) direction, the threaded members 92, which are prevented from rotating together with the screws 91 by their connection with the sheet retainer 52, are moved along the scews 91 toward (away) from the object support member 51. As the sheet retainer 52 moves together with the threaded members 92, it is therefore possible to vary the interval between the sheet retainer 52 and the object support member 51, enabling adjustment of the positional relation among the radiation source 10, the object 11 and the sheet 2 as required for recording enlarged radiation images.

In the recording of a radiation image, the sheet retainer 52 is first positioned on the circulation path 1 as indicated by the broken lines 52' for receiving one of the sheets 2. The sheet retainer 52 is then retracted to an appropriate position and the radiation source 10 is actuated for recording an enlarged radiation image on the sheet 2. When the recording of the enlarged radiation image is finished, the sheet retainer 52 is advanced back to the position indicated by the broken lines 52' and the sheet 2 held thereby is conveyed along the circulation path 1 in the direction indicated by the arrows A.

In the illustrated embodiment, the transfer means 9 is constructed for continuously moving the sheet retainer 52. Alternatively, however, it may be arranged for stepwise movement.

The embodiment of the invention described in the foregoing enables the adjustment of the positional relation among the radiation source 10, the object 11 and the sheet 2 required for recording of an enlarged radiation image to be carried out solely by the mechanical adjustment of the position of the sheet retainer 52, without need for adjusting the position of the object 11. It therefore greatly facilitates the smooth recording of enlarged radiation images.

The key feature of the present invention is that it enables adjustment of the interval between the object support member 51 and the sheet retainer 52 and the invention is not limited to the particular means for attaining this adjustment used in the foregoing embodiment. Alternatively, it is also possible, for example, to employ an arrangement in which the sheet retainer 52 is fixed and the object support member 51 is movable back and forth in the direction of the arrows B or an arrangement in which both the object support member 51 and the sheet retainer 52 are movable in the directions of the arrows B.

In the arrangement in which the object support member 51 is made movable in the directions indicated by the arrows B, the object support member 51 is first moved to the desired position and the portion of the object 11 whose radiation image is to be recorded is then brought into contact with the object support member. Thus, similarly to the embodiment described above, this arrangement also enables simple adjustment of the positional relation among the radiation source 10, the object 11 and the sheet 2 and, consequently, makes it possible to conduct recording of enlarged radiation images smoothly and with utmost ease.

The aforesaid embodiment relates to a chest type built-in radiation image recording and read-out apparatus in which the object stands in front of the object support member 51 during recording of the radiation image. However, the invention is also applicable to a bed type apparatus in which the object lies down during recording of the radiation image. In this case, the apparatus has a table-type object support member.

We claim:

1. An adjustable radiation image recording and read-out apparatus comprising:

(i) a plurality of independently controlled circulation and conveyance means for conveying at least one stimulable phosphor sheet (2) for recording a radiation image thereon along a predetermined circulation path, each of said circulation and conveyance means including means for frictionally supporting said sheet in vertical and horizontal positions to facilitate the transfer of said sheet from one of said plurality of circulation and conveyance means to another one of said circulation and conveyance means;

(ii) an image recording means (5) having radiation source means, and object support member, at least one of said independently controlled circulation and conveyance means positioned in said circulation path for temporarily holding a sheet in alignment with said source and object support member for recording a radiation transmission image of an object on said stimulable phosphor sheet by directing radiation through said object to said sheet, and transfer means (9) for moving said at least one circulation and conveyance means toward and away from said object support member for adjusting the distance between said object support member and said at least one circulation and conveyance means and returning said at least one circulation and conveyance means to said circulation path;

(iii) an image read-out means (6) having at least another of said independently controlled circulation and conveyance means positioned on said circulation path and consisting of a stimulating ray source (62) for emitting stimulating rays for scanning said stimulable phosphor sheet carrying said radiation image stored thereon in said image recording means, and a photoelectric read-out device (63) for detecting light emitted from said stimulable phosphor sheet scanned with said stimulating rays to obtain an electric image signal; and (iv) an erasing means (7) having at least another of said independently controlled circulation and conveyance means for, prior to the next image recording on said stimulable phosphor sheet for which the image read-out has been conducted in said image read-out section, having said stimulable phosphor sheet release the radiation energy remaining on said stimulable phosphor sheet.

2. An apparatus as defined in claim 1 wherein said transfer means comprises a pair of upper and lower externally threaded screws (91) enclosed horizontally within a lead case (53); a pair of internally threaded members (92) threaded on said screws respectively and supporting said at least one circulation and conveyance means therebetween, and a pair of motors (93) for rotating the screws, wherein the rotation of screws (91) adjusts the position of said at least one circulation and conveyance means with respect to the object support member (51).

3. An apparatus as defined in claim 1 wherein said at least one circulation and conveyance means comprises a belt conveyor (52a) and retaining rollers (52b) for pressing the phosphor sheet onto the belt conveyor.

* * * * *